(12) United States Patent
Schenning

(10) Patent No.: US 9,725,257 B2
(45) Date of Patent: Aug. 8, 2017

(54) DEVICE FOR HANDLING STACKABLE CARGO UNITS IN A CARGO SPACE, AS WELL AS A METHOD FOR HANDLING STACKABLE CARGO UNITS

(71) Applicant: Copal Development B.V., 's-Heerenberg (NL)

(72) Inventor: Jozef Gerhardus Henricus Maria Schenning, 's-Heerenberg (NL)

(73) Assignee: Copal Holding B.V., 's Heerenberg (NL)

( * ) Notice: Subject to any disclaimer, the term of this patent is extended or adjusted under 35 U.S.C. 154(b) by 7 days.

(21) Appl. No.: 14/649,070

(22) PCT Filed: Dec. 3, 2013

(86) PCT No.: PCT/NL2013/050870
§ 371 (c)(1),
(2) Date: Jun. 2, 2015

(87) PCT Pub. No.: WO2014/088416
PCT Pub. Date: Jun. 12, 2014

(65) Prior Publication Data
US 2015/0314972 A1     Nov. 5, 2015

(30) Foreign Application Priority Data
Dec. 4, 2012    (NL) .................................... 2009928

(51) Int. Cl.
*B65G 47/91*      (2006.01)
*B65G 65/08*      (2006.01)
(Continued)

(52) U.S. Cl.
CPC ............. *B65G 65/08* (2013.01); *B65G 35/06* (2013.01); *B65G 47/914* (2013.01);
(Continued)

(58) Field of Classification Search
CPC ...... B65G 61/00; B65G 47/901; B65G 47/91; B65G 47/918
(Continued)

(56) References Cited

U.S. PATENT DOCUMENTS

| 5,232,332 A | 8/1993 | Focke |
| 2009/0067953 A1* | 3/2009 | Schenning ........... B65G 47/914 414/140.3 |
| 2010/0239408 A1* | 9/2010 | Becker ................ B65G 47/914 414/800 |

FOREIGN PATENT DOCUMENTS

| DE | 10324755 A1 | 9/2004 |
| DE | 20 2004 009581 U1 | 10/2014 |

(Continued)

*Primary Examiner* — Gerald McClain
*Assistant Examiner* — Ronald Jarrett
(74) *Attorney, Agent, or Firm* — Schewchuk IP Services, LLC; Jeffrey D. Shewchuk

(57) ABSTRACT

The invention relates to a device (100) for loading/unloading stackable cargo units (101) such as boxes (101) from a cargo space, such as a sea container (102). Such a device (100) comprises a movable arm (104) with a head (110), comprising an array with downwardly directed gripping bodies (e.g. suction cups (211)). According to the invention there is a second grip section (220) with which the cargo units (101) can be gripped at the sides thereof. Hereby also cargo units (101) of a top row can be unloaded quickly. The invention also relates to a method for the loading/unloading of a cargo space.

13 Claims, 5 Drawing Sheets

(51) Int. Cl.
  *B65G 35/06*   (2006.01)
  *B65G 61/00*   (2006.01)
  *B65G 63/00*   (2006.01)
  *B65G 67/04*   (2006.01)
  *B65G 67/24*   (2006.01)
  *B65G 67/08*   (2006.01)

(52) U.S. Cl.
  CPC ........... *B65G 47/918* (2013.01); *B65G 61/00* (2013.01); *B65G 63/004* (2013.01); *B65G 67/04* (2013.01); *B65G 67/08* (2013.01); *B65G 67/24* (2013.01); *B65G 2201/025* (2013.01); *B65G 2201/0235* (2013.01); *B65G 2814/0311* (2013.01)

(58) Field of Classification Search
  USPC .............................................. 414/796.9, 797
  See application file for complete search history.

(56) References Cited

FOREIGN PATENT DOCUMENTS

| | | |
|---|---|---|
| WO | 88/02346 A1 | 4/1988 |
| WO | 2006121329 A1 | 11/2006 |

\* cited by examiner

DEVICE FOR HANDLING STACKABLE CARGO UNITS IN A CARGO SPACE, AS WELL AS A METHOD FOR HANDLING STACKABLE CARGO UNITS

The present invention relates to a device for handling stackable cargo units in a cargo space, wherein the device comprises a frame; and
comprises a movable arm which has a proximal end and a distal end, wherein the proximal end is connected to the frame, and the distal end is provided with a head for gripping at least one stackable cargo unit, wherein the head comprises a head section, which head section
is movable in height relative to the distal end of the arm; and
comprises a grip section, which grip section comprises an array of downwardly facing gripping organs for gripping at the upper side of at least one stackable cargo unit of that at least one stackable cargo unit.

The unloading of stackable cargo units from a cargo space, such as a cargo space of a truck or a sea container,—or the placement of cargo units in such a cargo space—is a labour intensive job. For facilitating this hard work, a device of the above type is known, e.g. from WO2006/121329, which comprises a transport track in the form of a conveyor belt. The gripping organs are in the form of suction cups. During the unloading of the cargo at least the first end of the frame can be introduced into the cargo space. The stackable cargo units are transported to an end of the device that is situated away from the arm by means of the transport track, where they are placed onto a conveyor belt or stacked onto a pallet manually or automatically and are carried off using a forklift truck or the like. The stackable cargo units are boxes, crates, or the like. They usually have h×w×l dimensions between 15 and 80 cm. The use of an arm permits carrying the weight of the stackable cargo units, whereby workers are less burdened physically or not even burdened at all and can work faster. Especially, if the cargo is cold (for instance frozen), a big advantage can be achieved with the device, since the workers otherwise would have to work wearing gloves, which gloves reduce grip and although they do increase comfort they complicate unloading. Furthermore, an arm makes it possible to simultaneously pick up more than one stackable cargo unit.

A problem is that a container that has to be unloaded may be loaded to such an extent that the array of vertically facing gripping organs cannot be introduced between the upper side of the cargo units and the upper side of the cargo space. Thus, these cargo units cannot be picked up with the head section. A similar problem exists when a container has to be filled completely. In that case, the head section has to be able to lift up the bottom of a cargo unit to be placed so high that it finds itself at at least the height of the upper side of another cargo unit onto which said cargo unit has to be placed. Because in that case the head section is limited by the top of the cargo space, this may be impossible.

The object of the present invention is to provide a solution for this.

To this end, a device according to the preamble is characterized in that the head section comprises a second grip section at a side of the grip section that comprises the array of downwardly facing gripping organs which is facing away from the side with said array of downwardly facing gripping organs, wherein the second grip section comprises an array of second gripping organs arranged tranverse to the downward direction and facing away from the distal end of the arm, which second gripping organs are movable tranverse to the downward direction of the downwardly facing gripping organs between a first position wherein the second gripping organs are situated relatively close to the distal end of the arm and a second position wherein the second gripping organs are situated relatively far from the distal end of the arm and protrude to beyond the grip section comprising the array of downwardly facing gripping organs.

When unloading, the second grip section of second gripping organs permits gripping the at least one cargo unit at a sidewall thereof, pulling the at least one cargo unit onto the grip section with the array of downwardly facing gripping organs and subsequently moving the at least one cargo unit using the movable arm to a desired location such as the first end of a transport track that can be driven such as a conveyor belt where the second grip section of second gripping organs pushes the at least one cargo unit off the array of downwardly facing gripping organs. When loading, for placing at least one cargo unit, in particular for placing cargo units of the top row, the at least one cargo unit can be gripped at a sidewall thereof by the second grip section, the at least one cargo unit can be pulled onto the first grip section with the array of downwardly facing gripping organs and subsequently the at least one cargo unit can be moved to the desired location and to the desired height in the cargo space using the movable arm, and finally by means of the second grip section of second gripping organs be pushed off the first grip section. The gripping organs are for instance gripping pins which protrude into the packaging such as a cardboard box or a bag of textile such as a gunny sack. The height of the device according to the invention, more specifically, the highest part thereof in the lowest position thereof, is preferably lower than the highest internal height of a sea container, i.e. lower than 2 m 75, and more preferably lower than the lowest type, i.e. lower than 2 m 25.

According to a favourable embodiment, the second gripping organs of the second grip section are suction cups.

Thus the sidewall of a stackable cargo unit can be gripped by means of vacuum.

According to a favourable embodiment, the head section is connected rotatably around an upright axis relative to the distal end of the arm with the arm.

This provides greater freedom when placing the at least one cargo unit onto a transport track. The head section is for instance rotatable because the head is mounted rotatably at the distal end of the arm.

According to a favourable embodiment, the head section are hydraulically adjustable in height relative to the distal end of the arm.

Thus, it can be avoided effectively to a large extent that when the at least one cargo unit is placed onto the grip section with the array of downwardly facing gripping organs, this grip section sags to an undesired extent, which would complicate the delivery of the at least one cargo unit present on the grip section with the array of downwardly facing gripping organs.

According to a favourable embodiment, the grip section is composed of units which comprise at least 1 downwardly facing gripping organ of the array of downwardly facing gripping organs, wherein the units can be moved independently from each other in a direction with a downward component.

Thus, it is ascertained that stackable cargo units of which the upper side is not horizontal, for instance because they collapsed at one side or at both sides, can still be picked up using the head. This spares the workers manual labour. Hereby also the working range (the height over which the array of gripping organs can be moved) is enlarged. This makes it possible to also pick up low (small) stackable packaging units from the bottom of the cargo space. Moving with a downward component is preferably achieved using a hinging parallellogram-construction. For instance, the units have the shape of fingers which extend away from the distal end of the arm.

According to a favourable embodiment, the second grip section comprises an array of telescopic fingers, wherein the second gripping organs are located at the distal ends of the telescopic fingers, wherein the telescopic fingers can move independently from each other in axial direction.

Thus, irregularaties, for instance caused by cargo units that are not aligned precisely or by a dent in the sidewall of a cargo unit, can be more effectively compensated for and the cargo unit or cargo units can be picked up more reliably. The telescopic fingers are for instance provided as pistons of cylinders, such as pistons of hydraulic cylinders.

According to a favourable embodiment, the gripping organs of the second grip section can be driven independently from each other.

This also contributes to the ability that irregularaties, for instance formed by a dent in the sidewall of a cargo unit, can be compensated more effectively and that the cargo unit or cargo units can be picked up more reliably.

According to a favourable embodiment, the device is a wheeled device.

This can then be used at various locations.

According to a favourable embodiment, the device is provided with a transport track.

Thus, a compact device is provided with which sea containers or the like can be unloaded effectively. The transport track preferably has a width of at least 40 cm and maximally 100 cm, and a length between 2 and 25 meters. Therewith a transport track with an adjustable length, such as a telescopic transport track, is preferred.

According to a favourable embodiment, the device and a second frame which comprises a transport track that can be driven form an assembly wherein the transport track that can be driven has a first end and a second end, and the device is movable in the longitudinal direction on and relative to the second frame.

Thus, the device can be moved as a whole together with the transport track that can be driven. The second frame has preferably wheels that are placed tranverse to the direction of transport of the transport track as a result of which it can be easily moved in a direction tranverse to the longitudinal direction of a cargo space such as a sea container. The transport track preferably has a width of at least 40 cm and maximally 100 cm, and a length between 2 and 25 meters. A transport track with an adjustable length, such as a telescopic transport track, is preferred.

Finally, the present invention relates to method for handling stackable cargo units in a cargo space, wherein stackable cargo units are gripped by means of a device which comprises an arm provided with a grip section which comprises an array of downwardly facing gripping organs, wherein a device according to any one of claims 1 to 9 is used.

Thus, a cargo space such as a cargo space of a truck or a (sea)container can be effectively loaded or unloaded.

According to a favourable embodiment, cargo units of a bottom row of cargo units are picked up using the grip section of downwardly facing gripping organs; and cargo units of a top row in the cargo space are picked up by means of a second grip section of gripping organs by positioning the grip section with the array of downwardly facing gripping organs near a row adjacent to and below the top row of stackable cargo units and placing at least one stackable cargo unit of the top row of cargo units by means of second gripping organs of the second grip section onto the first grip section.

Thus, cargo units can be unloaded effectively irrespective of the row height they are at. The arm will then be moved in order to deliver the at least one stackable cargo unit, for instance to a transport track.

The present invention will now be illustrated with reference to the drawing where FIG. 1 shows a side view of the device according to the invention;

Figure 1:
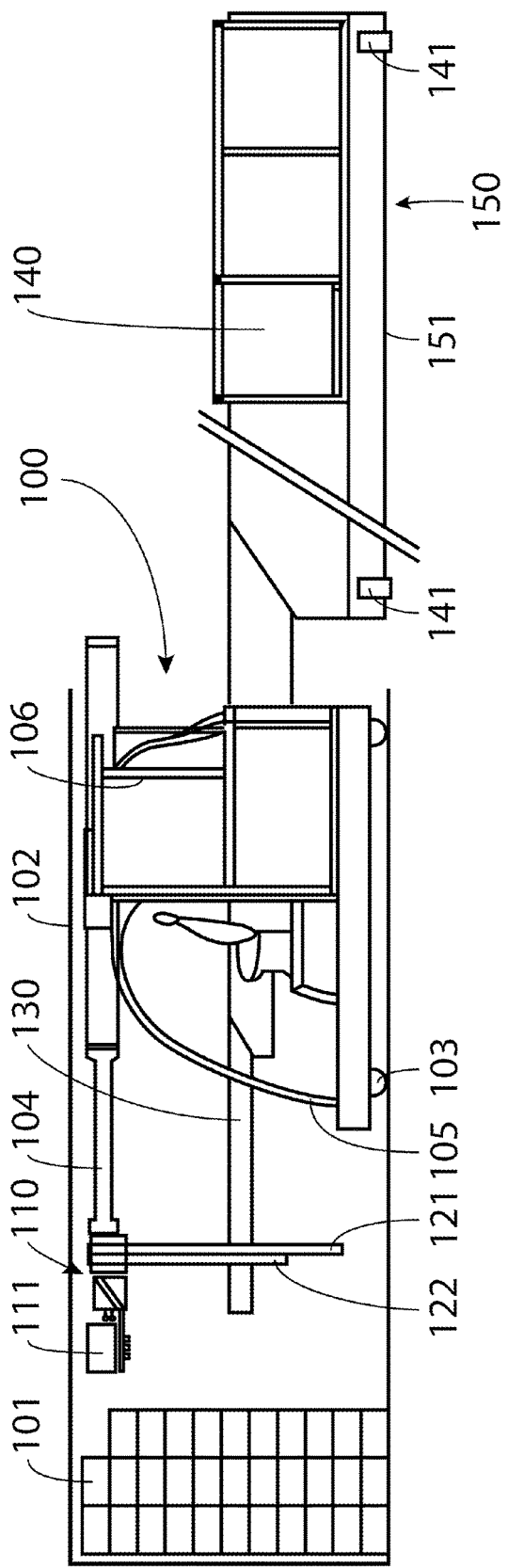

FIG. 1 shows a device 100 for unloading of stackable cargo units 101 (boxes 101) from a container 102, or a cargo space of a truck or the like. The device 100 is a wheeled device with wheels 103. The device has an arm 104 which is operated by an operator (not shown) from a cabin 105. The arm 104 is slidably mounted to a frame 106 to which the cabin 105 is also fixed. Because of the slidable aspect a larger working range can be provided.

The arm 104 is provided with a rotatable head 110 which comprises a first grip section of downwardly facing suction cups as well as a second grip section having suction cups that can move in a horizontal direction. The arrays are part of a head section 111 which can be moved in a vertical direction by means of a first hydraulic cylinder 121, wherein the whole of the first hydraulic cylinder 121 and the head section 111 can be moved in a vertical direction by means of a second hydraulic cylinder 122 as a result of which the head section 111 can be brought near the bottom of the container 102 and close to the ceiling of the container 102. The head section 111 will hereinafter be discussed in detail. The head 110 is used for gripping boxes 101 and placing them onto a conveyor belt 130 in order to transport them to a processing station 140.

With the device 100 shown here the conveyor belt 130 is in the form of a telescopic conveyor belt 130, which in FIG. 1 is shown in a extended position.

The conveyor belt 130 and the processing station 140 are part of an auxiliary device 150, which can be moved by means of transversely placed wheels 141. The auxiliary device 150 comprises a second frame 151 provided with the transversely placed wheels 141. The device 100 can be wheeled onto the second frame 151 and thus be transported simultaneously with the auxiliary device 150. This is very convenient when the device 100 and the auxiliary device 150 have to be used for loading/unloading another container. Instead, it is also possible that the conveyor belt 130 forms an integral part of the device 100.

Figure 2:
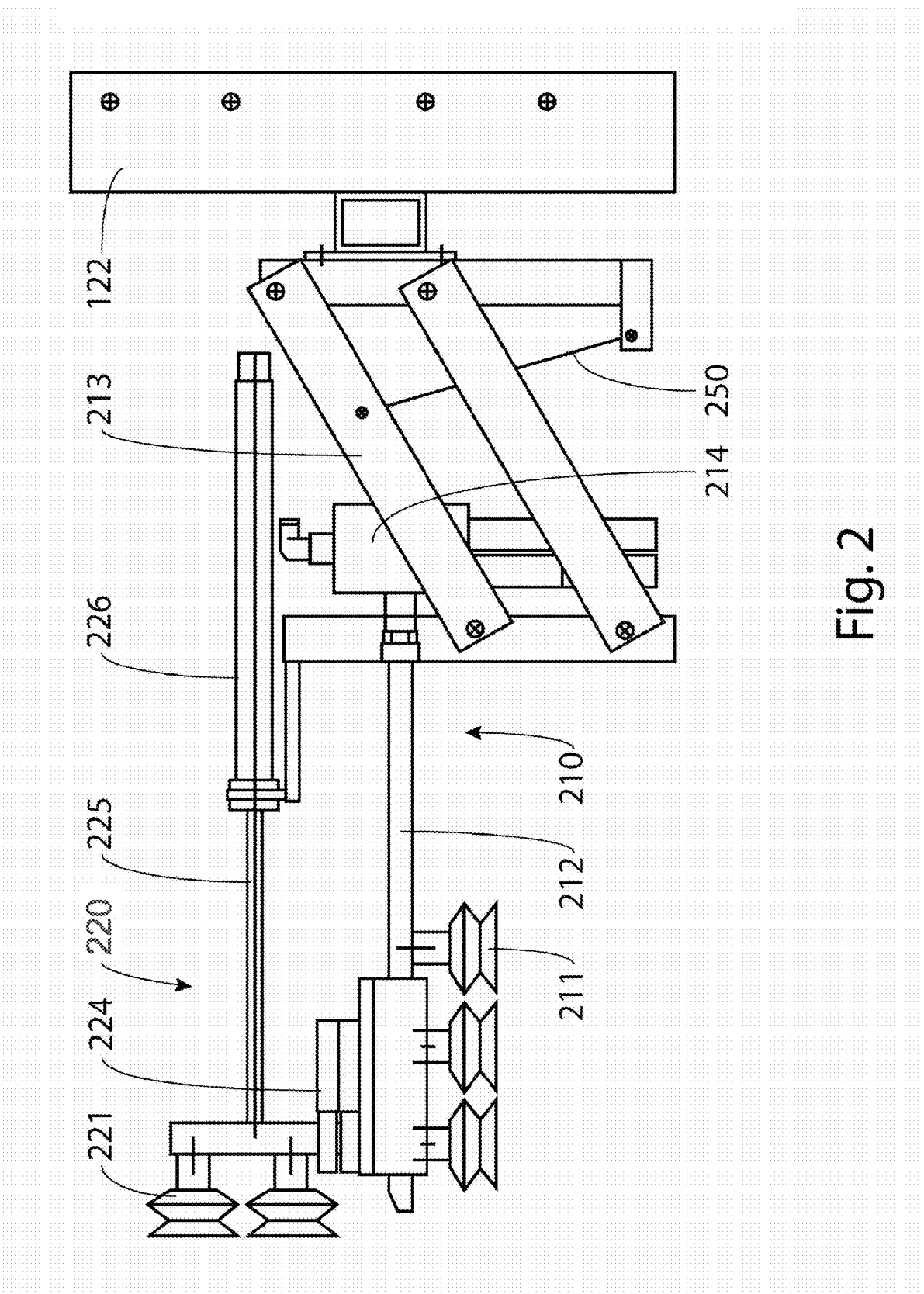
FIG. 2 shows a side view on the head of the device of FIG. 1 in a first position.

FIG. 2 shows the head section 111 in detail. A first grip section 210 can be seen of fingers 212 provided with downwardly facing suction cups 211 as downwardly facing gripping organs 211. The head section 111 can be moved freely over a limited distance in a vertical direction by means of a parallellogram-suspension 213. When the head section 111 is used to grip boxes with the downwardly facing suction cups 211, the first grip section 210 approaches the boxes 101 (not shown in FIG. 2) from above. As soon as there is contact between the downwardly facing suction cups 211 and the boxes 101 these are held by vacuum generated by vacuum generators 214 and can be placed onto the conveyor belt 130 by moving the arm 104 at which the vacuum is discontinued.

Since containers are often loaded all the way to the ceiling, it is not always possible to pick up the top row of boxes 101 with the first grip section 210 since the first grip section 210 cannot be introduced between the top row of boxes and the ceiling. In order to solve this problem the head section 111 has a second grip section 220 of second gripping organs 221, here also in the form of suction cups, provided with vacuum by vacuum generators 224. The suction cups are mounted at the distal ends of piston rods 225 of cylinders 226, by which they can be in a first position close to the distal end of the arm 104 (as shown in FIG. 3) or, as shown in FIG. 2, in a second position in which the second gripping organs 221 protrude beyond the first grip section 210.

According to a possible embodiment the parallellogram-suspension 213 is provided with an actuator 250, such as a cylinder, in order to lift up the head section 111, as a result of which the head section 111 can be lifted up extra high, to above the second hydraulic cylinder 122.

Figure 3:
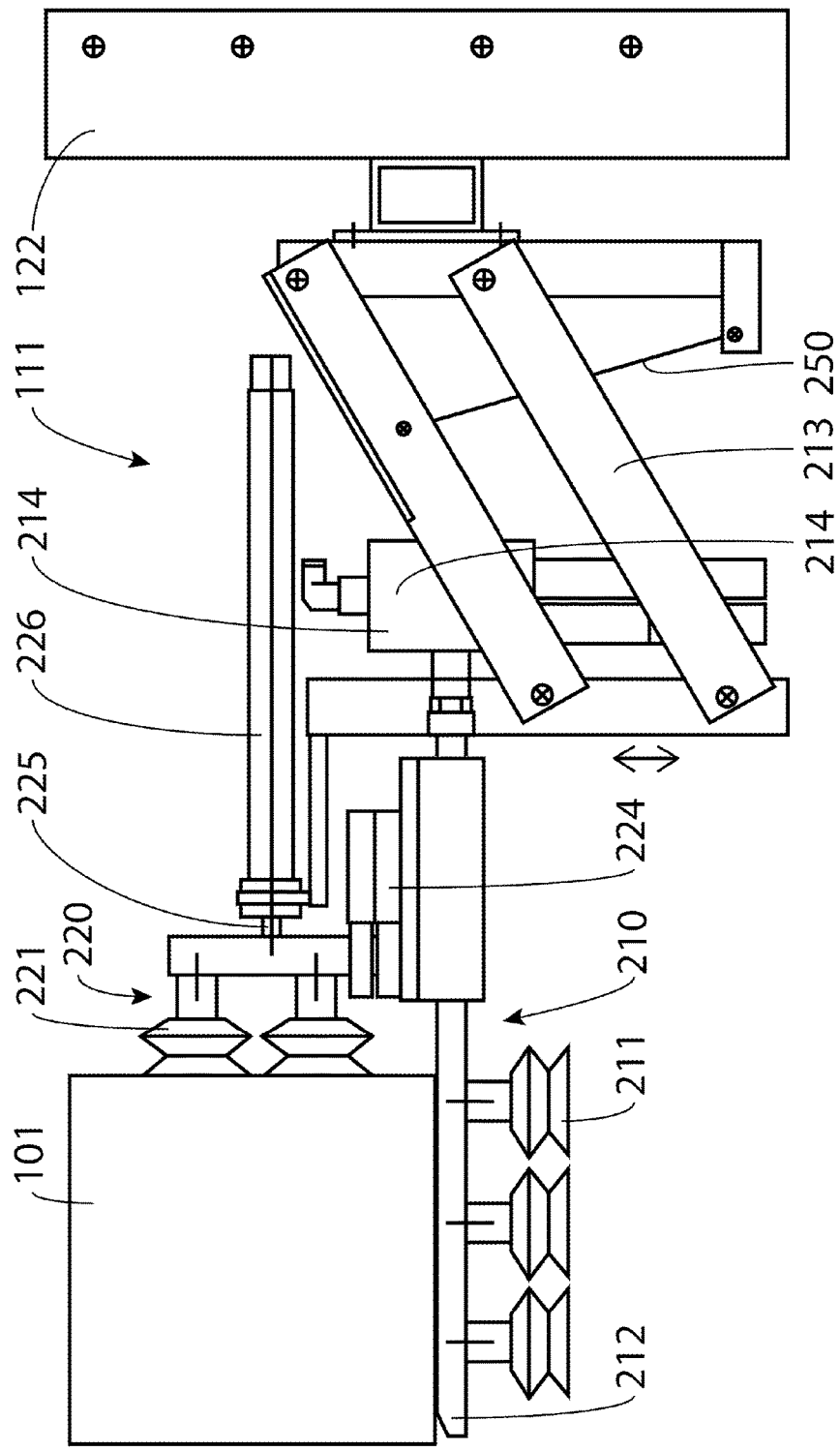
FIG. 3 shows a side view on the head of FIG. 2 in a second position.

FIG. 3 shows the head section 111 in the first position (in which the second gripping organs 221 are close to the distal end of the arm 104), wherein the second grip section 220 has slid part of the row of boxes 101 onto the fingers 212 of the first grip section 210. For placement onto the conveyor belt 130 the piston rods 225 will again be slid from the cylinders 226.

Figure 4:
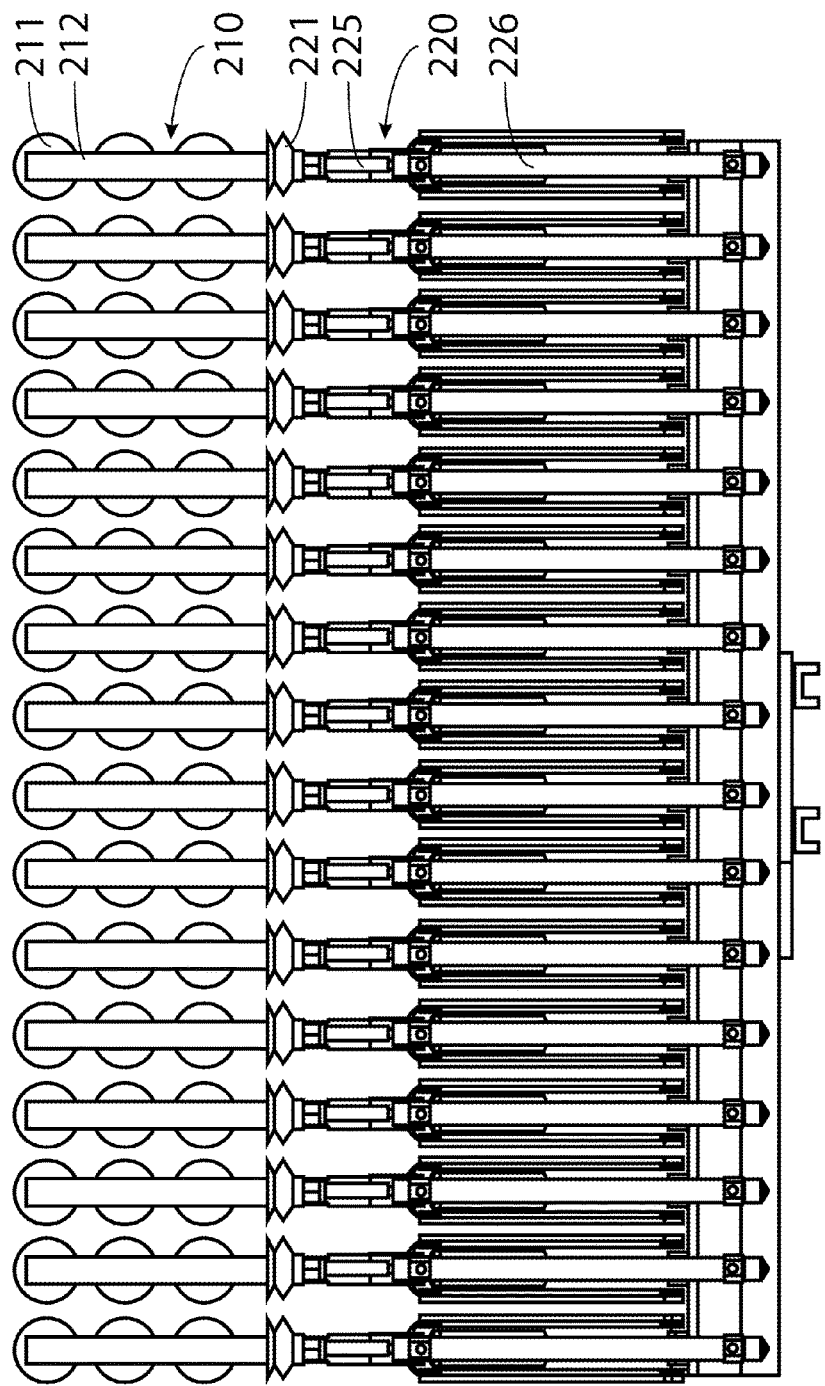
FIG. 4 shows a top view on the head of FIG. 3 in the first position.

FIG. 4 shows a top view of the head section 111 in the first position. The pistons 225 of the cylinders 226 form telescopic fingers with at the distal ends thereof the second gripping organs 221 (suction cups).

Figure 5:
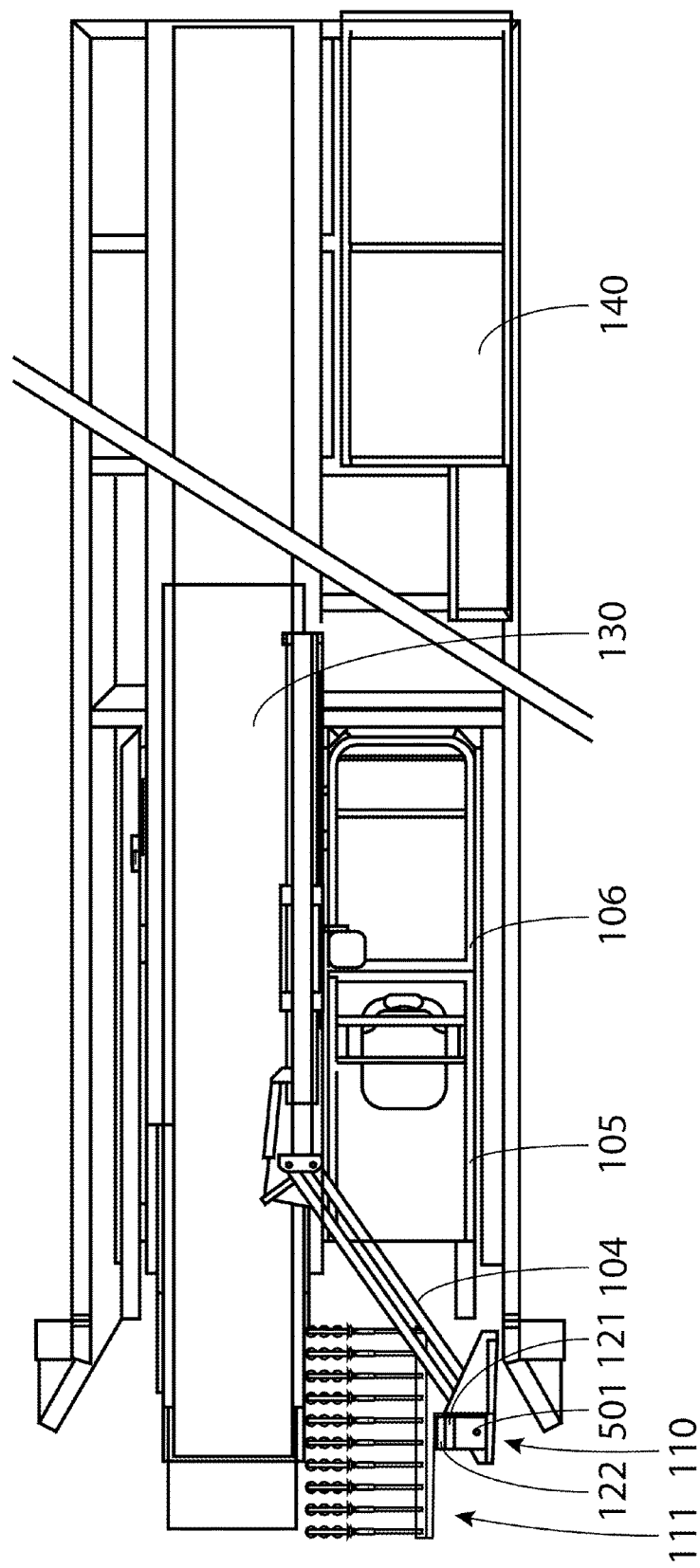
FIG. 5 shows a top view on the device of FIG. 1.

FIG. 5 shows the device 100 in a top view at the moment of delivering a number of cargo units 101, which have been taken from a top row of cargo units in the container 102, to the conveyor belt 130. Herewith the first grip section 210 is situated next to the conveyor belt 130 through which the boxes placed on the fingers 212 of the first grip section 210 can be pushed onto the conveyor belt 130 by the second grip section 220.

FIG. 5 shows an upright axis 501 around which the head 110 can rotate.

Within the scope of the accompanying claims the invention can be varied in various ways. For example, a separate organ may be provided for pushing a cargo unit on the array off the first grip section, as a result of which this is not done by the second grip section.

Within the scope of the accompanying claims the invention can be varied in various ways. For example, the first head section may also comprise a further array of gripping organs which point in the same direction as the second gripping organs but are closer to the distal end of the arm than the array of downwardly facing gripping organs and lower than the last-mentioned gripping organs. In this way a cargo unit can be gripped at the upper side as well as at a sidewall thereof.

The invention claimed is:

1. A device for handling stackable cargo units in a cargo space, wherein the device
comprises a frame; and
comprises a movable arm which has a proximal end and a distal end, wherein the proximal end is connected to the frame, and the distal end is provided with a head for gripping at least one stackable cargo unit, wherein the head comprises a head section, which head section is movable in height relative to the distal end of the arm; and
comprises a first grip section, which first grip section comprises an array of downwardly facing gripping organs for gripping at the upper side of at least one stackable cargo unit in the cargo space,
characterized in that the head section comprises a second grip section, the second grip section being locatable above the first grip section, wherein the second grip section comprises an array of second gripping organs arranged transverse to the downward direction and facing away from the distal end of the arm, which second gripping organs are movable transverse to the downward direction between a first position wherein the second gripping organs are situated relatively close to the distal end of the arm and a second position wherein the second gripping organs are situated relatively far from the distal end of the arm and protrude to beyond the first grip section.

2. The device according to claim 1, wherein the second gripping organs of the second grip section are suction cups.

3. The device according to claim 1, wherein the head section is connected with the arm such that the head section is rotatable relative to the distal end of the arm around an upright axis.

4. The device according to claim 1, wherein the head section is hydraulically adjustable in height relative to the distal end of the arm.

5. The device according to claim 1, wherein the first grip section is composed of grip section units each of which comprise at least one downwardly facing gripping organ of the array of downwardly facing gripping organs, wherein the grip section units can be moved independently from each other in a direction with a downward component.

6. The device according to claim 1, wherein the second grip section comprises an array of telescopic fingers, wherein the second gripping organs are located at the distal ends of the telescopic fingers, wherein the telescopic fingers can move independently from each other in axial direction.

7. The device according to claim 1, wherein the gripping organs of the second grip section can be driven independently from each other.

8. The device according to claim 1, wherein the device is a wheeled device.

9. The device according to claim 1, wherein the device is provided with a transport track.

10. The device according to claim 1, wherein the device and a second frame which comprises a drivable transport track form an assembly wherein the drivable transport track has a first end and a second end, and the device is movable in the longitudinal direction on and relative to the second frame.

11. Method for handling stackable cargo units in a cargo space, comprising:
gripping one cargo unit out of a stack of cargo units by means of a device which comprises:
a frame;
a movable arm which has a proximal end and a distal end, wherein the proximal end is connected to the frame, and the distal end is provided with a first grip section which comprises an array of downwardly facing gripping organs; and
a second grip section, the second grip section being locatable above the first grip section, wherein the second grip section comprises an array of second gripping organs arranged horizontally and facing away from the distal end of the arm, which second gripping organs are movable horizontally between a first position wherein the second gripping organs are situated relatively close to the distal end of the arm and do not protrude beyond the first grip section and a second position wherein the second gripping organs are situated relatively far from the distal end of the arm and protrude to beyond the first grip section.

12. Method according to claim 11, comprising:
picking up at least one cargo unit from a bottom row of cargo units using the first grip section; and
horizontally moving at least one cargo unit in a top row of cargo units in the cargo space by positioning the first grip section near a row of cargo units adjacent to and below the top row of cargo units and by using the second grip section.

13. The method of claim 12, wherein the horizontally moving act moves the at least one cargo unit by sliding the at least one cargo unit on the first grip section.

* * * * *